United States Patent [19]

Toyooka et al.

[11] Patent Number: 5,288,825
[45] Date of Patent: Feb. 22, 1994

[54] FLUOROACRYLIC POLYMER HAVING LUBRICATING EFFECT AND THERMOPLASTIC RESIN COMPOSITION COMPRISING SAME

[75] Inventors: Yutaka Toyooka; Kohji Matsumoto; Hideki Koizumi; Masahiro Kaneda, all of Otake; Kenji Okano, Kawasaki, all of Japan

[73] Assignee: Mitsubishi Rayon Company Ltd., Tokyo, Japan

[21] Appl. No.: 968,475

[22] Filed: Oct. 29, 1992

Related U.S. Application Data

[63] Continuation of Ser. No. 674,951, Mar. 26, 1991, abandoned.

[30] Foreign Application Priority Data

Mar. 29, 1990 [JP] Japan ................. 2-78687

[51] Int. Cl.$^5$ ............................................. C08F 18/20
[52] U.S. Cl. ................................................... 526/245
[58] Field of Search .......................................... 526/245

[56] References Cited

FOREIGN PATENT DOCUMENTS

| | | | |
|---|---|---|---|
| 0195714 | 9/1986 | European Pat. Off. | ............ 526/245 |
| 2223404 | 10/1974 | France . | |
| 2243209 | 4/1975 | France . | |
| 0215410 | 12/1983 | Japan | ................. 526/245 |
| 0129208 | 7/1984 | Japan | ................. 526/245 |
| 60-191447 | 9/1985 | Japan | ................. 526/245 |
| 63-54410 | 3/1988 | Japan | ................. 526/245 |

OTHER PUBLICATIONS

Official Gazette 1046 TMOG-2-Sep. 4, 1984.
Chemical Abstracts, vol. 93, No. 10, 1980, abstract No. 96168e, Columbus, Oh., US; & JP-A-55 007 820 (Asahi Glass Co., Ltd) Jan, 21, 1980.

*Primary Examiner*—Joseph L. Schofer
*Assistant Examiner*—N. Sarofim
*Attorney, Agent, or Firm*—Oblon, Spivak, McClelland, Maier & Neustadt

[57] ABSTRACT

A fluoroacrylic polymer having a lubricating effect, which comprises at least one kind selected from units derived from a fluoroalkyl acrylate and units derived from a fluoroalkyl methacrylate as a part or all of structural units and a reducing viscosity $\eta Sp/C$ not higher than 2 as measured at 25° C. with respect to a solution of 0.1 g of the polymer in 100 ml of chloroform. The fluoroacrylic polymer is incorporated into a thermoplastic resin for rendering an excellent lubricating property thereto.

9 Claims, No Drawings

FLUOROACRYLIC POLYMER HAVING LUBRICATING EFFECT AND THERMOPLASTIC RESIN COMPOSITION COMPRISING SAME

This application is a continuation of application Ser. No. 07/674,951, filed on Mar. 26, 1991, now abandoned.

BACKGROUND OF THE INVENTION

(1) Field of the Invention

The present invention relates to a fluoroacrylic polymer having a good stain resistance, water repellency and oil repellency and exhibiting a lubricating effect, and further to a thermoplastic resin composition having a good stain resistance, water repellency, oil repellency and lubricating property, which comprises a thermoplastic resin and having the above-mentioned fluoroacrylic polymer incorporated therein.

(2) Description of the Related Art

Thermoplastic resins, especially vinyl chloride resins, have very good various physical and chemical properties, and therefore, are widely used in various fields. Nevertheless, these thermoplastic resins are defective in that they have a poor workability. Accordingly, as a means of overcoming this defect, a method has been adopted in which a plasticizer, a processing aid such as a copolymer composed mainly of methyl methacrylate and a lubricant are added, but this method is not satisfactory.

Various research and development has been carried out with a view to solving the above problem, and various vinyl chloride resin compositions comprising processing aid have been proposed; for example, in Japanese Examined Patent Publication No. 52-781, Japanese Examined Patent Publication No. 52-3668, and Japanese Examined Patent Publication No. 50-37699.

The object of these compositions is to maintain a high transparency inherently possessed by the vinyl chloride resin and improve the long-term durability of the workability thereof, such as the drawdown and the elongation at a high temperature, and the lubricating property such as the releasing from the roll surface at the calendering step, and certain effects are attained in these compositions.

Nevertheless, from the viewpoint of improving the productivity and quality, or attaining an energy-saving effect, the development of a vinyl chloride resin composition having a highly durable lubricating property upon working and able to provide a molded article having a good stain resistance, water repellency, oil repellency, gloss and transparency is urgently required. The above-mentioned conventional compositions, however, are unsatisfactory in that they fail to meet the above-mentioned requirements.

SUMMARY OF THE INVENTION

Therefore, a primary object of the present invention is to provide a thermoplastic resin composition which can be formed into a molded article having a good lubricating property, stain resistance, water repellency and oil repellency, and a lubricating property-imparting polymer to be used for the preparation of such a resin composition.

In accordance with the present invention, there is provided a fluoroacrylic polymer having a lubricating effect, which comprises at least one kind of unit selected from units derived from a fluoroalkyl acrylate and units derived from a fluoroalkyl methacrylate as a part or all of the structural units and a reducing viscosity $\eta Sp/C$ not higher than 2 as measured at 25° C. with respect to a solution of 0.1 g of the polymer in 100 ml of chloroform.

Furthermore, in accordance with the present invention, there is provided a thermoplastic resin composition having a good lubricating property, which comprises 100 parts by weight of a thermoplastic resin and 0.01 to 20 parts by weight of a fluoroacrylic polymer having a lubricating effect, as mentioned above.

DESCRIPTION OF THE PREFERRED EMBODIMENTS

In the present invention, monomers represented by the following basic structural formula (I):

wherein m is 0 or an integer of from 1 to 5, n is an integer of from 1 to 10, X is F or H, and Z is H or $CH_3$ are used as the fluoroalkyl acrylate or fluoroalkyl methacrylate. As specific examples of the fluoroalkyl methacrylate, there can be mentioned 2,2-difluoroethyl methacrylate (2FM), 2,2,2-trifluoroethyl methacrylate (3FM), 2,2,3,3-tetrafluoropropyl methacrylate (4FM), 2,2,3,3,3-pentafluoropropyl methacrylate (5FM), 2,2,3,3,4,4-hexafluorobutyl methacrylate (6FM), 2,2,3,3,4,4,5,5-octafluoropentyl methacrylate (8FM), 1,1-ditrifluoromethyl-2,2,2-trifluoroethyl methacrylate (9FM), 2,2,3,3,4,4,5,5,6,6,7,7-dodecafluoroheptyl methacrylate (12FM), 3,3,4,4,5,5,6,6,7,7,8,8,8-tridecafluorooctylmethyl methacrylate (13FM), and 3,3,4,4,5,5,6,6,7,7,8,8,9,9,10,10,10-heptadecafluorodecyl methacrylate (17FM). As specific examples of the fluoroalkyl acrylate, there can be mentioned 2,2-difluoroethyl acrylate (2FA), 2,2,2,-trifluoroethyl acrylate (3FA), 2,2,3,3-tetrafluoropropyl acrylate (4FA), 2,2,3,3,3-pentafluoropropyl acrylate (5FA), 2,2,3,3,4,4-hexafluorobutyl acrylate (6FA), 2,2,3,3,4,4,5,5-octafluoropentyl acrylate (8FA), 1,1-ditrifluoromethyl-2,2,2-trifluoroethyl acrylate (9FA), 2,2,3,3,4,4,5,5,6,6,7,7-dodecafluoroheptyl acrylate (12FA), 3,3,4,4,5,5,6,6,7,7,8,8-tridecafluorooctylmethyl acrylate (13FA), and 3,3,4,4,5,5,6,6,7,7,8,8,9,9,10,10,10-heptadecafluorodecyl acrylate (17FA). These methacrylates and acrylates can be used alone or in the form of mixtures of two or more thereof.

All or a part of the structural units of the fluoroacrylic polymer of the present invention are constructed by at least one kind of unit selected from units derived from a fluoroalkyl acrylate and units derived from a fluoroalkyl methacrylate, and the reducing viscosity of this polymer is not higher than 2, preferably not higher than 1.8. If these conditions are satisfied, the kind of the polymer is not particularly critical. Namely, any random copolymers and multiple-stage polymers, such as a polymer obtained by the two-stage polymerization process and a polymer obtained by the three-stage polymerization process, can be used. A polymer having a reducing viscosity higher than 2 is not used in the present invention, because such a polymer has a poor flowability and release property at the molding step.

The reducing viscosity can be appropriately adjusted according to the chain transfer agent, catalyst and polymerization temperature adopted at the polymerization. The reducing viscosity $\eta Sp/C$ referred to in the present invention is determined at 25° C. with respect to a solution of 0.1 g of the fluoroacrylic polymer in 100 ml of chloroform by an Ostwald viscometer.

In the fluoroacrylic polymer of the present invention, at least one kind of fluoroalkyl acrylate units and fluoroalkyl methacrylate units is contained, preferably in an amount of at least 5.0% by weight, as the structural units. The kind of copolymerizable comonomer to be used for the formation of the fluoroacrylic polymer of the present invention is not particularly critical, and an appropriate monomer can be selected and used according to the intended final object. For example, there can be mentioned methacrylates such as methyl methacrylate, ethyl methacrylate, propyl methacrylate, butyl methacrylate, 2-ethylhexyl methacrylate and benzyl methacrylate, acrylates such as ethyl acrylate, propyl acrylate, butyl acrylate, 2-ethylhexyl acrylate and benzyl acrylate, and acrylamide, acrylic acid, methacrylic acid, styrene, alkyl-substituted styrene, halogen-substituted, styrene acrylonitrile and methacrylonitrile. These monomers can be used alone or in the form of mixtures of two or more thereof.

Specific examples of the monomer construction and polymerization order in the fluoroacrylic polymer of the present invention are as follows:

(a) MMA←St/BA←MA/FM and/or FA,
(b) MMA←St/BA/FM and/or FA←MMA,
(c) MMA←FM and/or FA/BA←MMA,
(d) MMA←BMA/BA←MMA/FM and/or FA,
(e) MMA/FM and/or FA←St/BA←MMA,
(f) FM and/or FA←St/BA←MMA,
(g) MMA←FM and/or FA←MMA,
(h) MMA←St/BA←FM and/or FA,
(i) FM and/or FA←FM and/or FA←MMA,
(j) FM and/or FA←FM and/or FA←FM and/or FA,
(k) MMA/FM and/or FA←MMA,
(l) FM and/or FA←MMA,
(m) MMA←MMA/FM and/or FA,
(n) MMA←FM and/or FA,
(o) FM and/or FA←FM and/or FA,
(p) FM and/or FA/EA←MMA, and
(q) MMA←FM and/or FA/EA.

In the above description, the respective symbols and abbreviations have the following meanings:

"←": polymerization order
"(A) and/or (B)": (A) alone, (B) alone or (A) and (B)
MMA: methyl methacrylate
St: styrene
BA: butyl acrylate
EA: ethyl acrylate
BMA: butyl methacrylate
FM: fluoroalkyl methacrylate
FA: fluoroalkyl acrylate In the fluoroacrylic polymer of the present invention, to exhibit the lubricating effect, i.e., the effect of increasing the flowability and release property at the molding step, at the highest efficiency, in the case of a random copolymer, the Tg of the entire polymer must be not higher than 70° C., and in the case of a polymer formed by the two-stage polymerization process, the Tg of a polymer obtained by the first stage polymerization or the second stage polymerization must be not higher than 70° C. In the case of a polymer obtained by the three-stage polymerization process, the Tg of the polymer obtained by the second stage polymerization must be not higher than 70° C. To obtain a polymer having such a low Tg, preferably a monomer, for example, an acrylic acid ester such as butyl acrylate, ethyl acrylate, 2-ethylhexyl acrylate or benzyl acrylate, or a methacrylic acid ester such as butyl methacrylate, ethyl methacrylate, 2-ethylhexyl methacrylate or benzyl methacrylate, is used in combination with a fluoroacrylic monomer as mentioned above, or a fluoroacrylic monomer is used alone.

The reducing viscosity of each of the polymers obtained at the respective stages of polymerization is preferably as low as permissible. If the Tg is higher than 70° C. and the reducing viscosity is not lower than 2, the viscosity of the resin is increased during the extrusion molding, the flowability and release property become poor, and the lubricating effect is lowered. The amount of the monomer constituting the polymer by the two-stage polymerization or the second stage polymer in the three-stage polymerization, which has a low Tg and a low reducing viscosity, is preferably at least 20 parts by weight per 100 parts by weight of the whole polymer. If the amount is smaller than this level, as where the reducing viscosity is high, while the obtained fluoroacrylic polymer is molded, the flowability and release property become poor and the lubricating effect is lowered.

As the polymerization process for the preparation of the fluoroacrylic polymer of the present invention, there can be adopted, for example, an emulsion polymerization, suspension polymerization and bulk polymerization, but preferably an emulsion polymerization is adopted. To form a fluoroacrylic polymer having a two-layer or three-layer structure by the emulsion polymerization, preferably the polymerization of the second or third stage is advanced without adding fresh emulsifier, and the formation of a homopolymer of the monomer component for the second stage or third stage is controlled.

Any known emulsifiers can be used, for example, ordinary anionic, cationic and nonionic surface active agents can be used, and furthermore, a fluorine type emulsifier can be used. A certain emulsifier renders the pH value of the polymerization mixture alkaline, and in this case, an appropriate pH-adjusting agent can be added to prevent a hydrolysis of the acrylic acid ester. As the pH-adjusting agent, there can be used boric acid/potassium chloride/sodium hydroxide, potassium dihydrogen phosphate/disodium hydrogenphosphate, boric acid/potassium chloride/sodium carbonate, boric acid/sodium carbonate, potassium hydrogencitrate/citric acid, potassium dihydrogenphosphate/borax and disodium hydrogenphosphate/citric acid. Water-soluble or oil-soluble polymerization initiators can be used alone, or oxidation-reduction type polymerization initiators can be used. For example, an ordinary water-soluble inorganic initiator such as a persulfate can be used alone, or can be used as a redox initiator in combination with a sulfite, a hydrogensulfite or a thiosulfate. Furthermore, an organic redox initiator such as organic hydroperoxide/sodium form aldehyde sulfoxylate or an azo compound can be used.

By incorporating 0.01 to 20 parts by weight of the above-mentioned fluoroacrylic polymer into 100 parts by weight of a thermoplastic resin such as a vinyl chloride resin, a polycarbonate resin, a polyester resin, an ABS resin, a styrene resin, an MBS resin, a methacrylic resin, a polyethylene resin or a polyphenylene ether resin, there can be obtained a resin composition having a good lubricating effect, i.e., a good flowability and release property, at the molding step and giving a molded article having a good stain resistance, water repellency and oil repellency. If the amount incorporated of fluoroacrylic polymer exceeds 20 parts by weight, the lubricating effect is too high and the shape and gloss of the molded article become poor. If the amount incorporated of the fluoroacrylic polymer is smaller than 0.01 part by weight, since the flowability and release property become poor at the molding step, a conspicuous generation of heat occurs and color fading is caused in the molded article.

The addition of the fluoroacrylic polymer of the present invention to the thermoplastic resin is accomplished according to customary blending procedures.

A stabilizer such as an organic tin compound, a lead, barium or zinc containing metal soap or an epoxy compound, a lubricant such as a stearic acid ester wax, paraffin wax or stearyl alcohol, a plasticizer such as a phthalic acid ester, a phosphoric acid ester, a fatty acid ester or an epoxy plasticizer, a coloring agent such as carbon black or titanium oxide, an inorganic foaming agent such as ammonia carbonate or sodium bicarbonate, or an organic foaming agent such as a nitro type foaming agent, a sulfohydrazide type foaming agent, an azo type foaming agent and other organic foaming agent can be added to the resin composition according to need.

EXAMPLES

The present invention will now be described in detail with reference to the following examples and comparative examples. In the examples and comparative examples, all of "parts" are by weight.

The reducing viscosity $\eta Sp/C$ of each polymer is that observed when the constituent monomers are polymerized, and the $\eta Sp/C$ value is determined by carrying out the polymerization by using a predetermined emulsifier, polymerization initiator and polymerization temperature while changing the chain transfer agent.

The methods adopted for determining and evaluating the characteristics in the examples and comparative examples are described below.

(1) Flowability of polymer alone

In a nozzle having a hole diameter of 1 mm, 5 g of a sample was charged at a temperature of 200° C. by using a melt indexer, and the amount extruded under a load of 5 kg for 10 minutes was measured. The results are shown in Table 4 given hereinafter. A larger extrusion quantity means a higher lubricating property.

(2) Characteristics of thermoplastic resin composition

By a Henschel mixer, 3 parts of a polymer obtained in any of Examples 1 through 35 and Comparative Examples 1 through 12 given hereinafter were mixed using a Henschel mixer with 100 parts of a polyvinyl chloride resin (average polymerization degree of 700), 1.5 parts of butyl tin mercaptide, 1.0 part of an epoxy type assistant and 0.5 part of dibutyl tin maleate, and the vinyl chloride resin compositions of the present invention (Examples 1 through 35) and Comparative Examples 2 through 12 were thus obtained.

The following characteristics of each of these compositions were evaluated under the conditions described below.

Stickiness

By using 6-inch rolls, 100 g of a sample was kneaded at a kneading temperature of 205° C.×200° C. at a roll spacing of 1 mm, and the time required for the formed sheet to adhere to the roll surface and not to peel from the roll surface was measured. The longer this time, the higher the lubricity durability at a high temperature.

Flowability

By using a single-screw extruder having a screw diameter of 25 mm, the sample was extruded under the conditions described below and the amount extruded for 3 minutes was measured. The larger the extrusion amount or the higher the extrusion pressure, the better the flowability and the higher the lubricating property.

Extrusion conditions
$C_1$: 160° C.
$C_2$: 170° C.
$C_3$: 180° C.
D: 180° C.
Rotation number: 40 rpm

Stain resistance

By using 6-inch rolls, 100 g of a sample was kneaded at a kneading temperature of 180° C. at a roll spacing of 3 mm, and the obtained sheet was pressed at a pressing temperature of 180° C. for 7 minutes to obtain a sheet having a thickness of 5 mm and a good surface state. The contact angle $\theta$ was measured at a temperature of 22° C. at a constant dropping rate (speed) by using water and an oil (olive oil) as the liquid, by an automatic contact angle meter. A larger contact angle $\theta$ indicates a better stain resistance.

The abbreviations in Tables 1 through 3 and 5 given hereinafter have the following meanings:
MMA: methyl methacrylate
St: styrene
BA: butyl acrylate
EA: ethyl acrylate
BMA: butyl methacrylate
17FM: 3,3,4,4,5,5,6,6,7,7,8,8,9,9,10,10,10-heptadecafluorodecyl methacrylate
3FM: 2,2,2-trifluoroethyl methacrylate
n-osh: n-octylmercaptan

EXAMPLE 1

A reaction vessel equipped with a stirrer and a reflux cooler was charged with 280 parts of deionized water, 1.5 parts of sodium dioctylsulfosuccinate, 4.0 parts of cumene hydroperoxide, 50 parts of methyl methacrylate, 30 parts of butyl acrylate, 20 parts of 3,3,4,4,5,5,6,6,7,7,8,8,9,9,10,10,10-heptadecafluorodecyl methacrylate (17FM) and 0.5 part of n-octylmercaptan. The inner atmosphere of the reaction vessel was replaced with nitrogen, 4.0 parts of sodium formaldehyde sulfoxylate was added while stirring, and the temperature in the reaction vessel was elevated to 70° C. Heating was conducted while stirring for 5 hours to complete the polymerization, the obtained polymer latex was cooled, and aluminum chloride was added to effect salting-out, followed by filtration, washing and drying, whereby a powdery polymer was obtained. The characteristics of the vinyl chloride resin composition comprising this polymer are shown in Table 1.

EXAMPLES 2 THROUGH 8

Using the same reaction vessel as used in Example 1, polymers having a monomer composition shown in Table 1 were prepared, and the salting-out, filtration, washing and drying were carried out in the same manner as described in Example 1 to obtain the powdery polymers shown in Table 1. The characteristics of the vinyl chloride resin compositions comprising these polymers are shown in Table 1.

COMPARATIVE EXAMPLE 1

The characteristics of a vinyl chloride resin composition (blank) formed by adding the stabilizer and the like to the vinyl chloride resin, without adding the fluoroacrylic polymer of the present invention, are shown in Table 1.

COMPARATIVE EXAMPLES 2 THROUGH 4

Polymers having a monomer composition shown in Table 1 were prepared in the same reaction vessel as used in Example 1, and the salting-out, filtration, washing and drying were then carried out in the same manner as described in Example 1 to obtain the various powdery polymers shown in Table 1. The characteristics of the vinyl chloride resin compositions comprising these polymers are shown in Table 1.

sodium dioctylsulfosuccinate, 4.0 parts of cumene hydroperoxide and 50 parts of methyl methacrylate, and the inner atmosphere of the reaction vessel was substituted with nitrogen and 4.0 parts of sodium formaldehyde sulfoxylate was added with stirring into the reaction vessel. The inner temperature of the reaction vessel was elevated to 70° C. and heating was conducted while stirring for 3 hours to complete the polymerization of the first stage. Then, in the presence of the obtained polymer, a mixture comprising 10 parts of methyl methacrylate, 40 parts of 17FM and 0.8 part of n-octylmercaptan was dropped as the monomer component of the second stage over a period of 3 hours, and the polymerization was conducted for 3 hours to form a polymer of the second stage. Then, salting-out, filtration, washing and drying were carried out in the same manner as described in Example 1, to obtain a powdery polymer. The characteristics of a vinyl chloride resin composition comprising this polymer are shown in Table 2.

EXAMPLES 10 THROUGH 20 AND COMPARATIVE EXAMPLES 5 THROUGH 7

Polymers having a monomer composition shown in Table 2 were prepared under the same conditions as described in Example 9 in the same reaction vessel as used in Example 1. The characteristics of vinyl chloride resin compositions comprising these polymers are shown in Table 2.

TABLE 1

| | Monomer Composition | $\eta Sp/C$ | Stain Resistance ($\theta$) (water/oil) | Stickiness (min) | Flowability pressure (kg · m) | extrusion quantity (g/3 min) |
|---|---|---|---|---|---|---|
| Example 1 | MMA/BA/17FM/n-osh 50  30  20  0.5 | 1.5 | 100/60 | 10 | 35 | 115 |
| Example 2 | MMA/BA/17FM/n-osh 30  10  60  0.5 | 1.5 | 100/70 | 15 | 34 | 114 |
| Example 3 | MMA/17FM/n-osh 50  50  0.5 | 1.5 | 100/65 | 15 | 34 | 110 |
| Example 4 | EA/3FM/n-osh 40  60  0.4 | 1.8 | 100/60 | 13 | 40 | 108 |
| Example 5 | 17FM/n-osh 100  0.5 | 1.5 | 100/80 | 15 | 34 | 115 |
| Example 6 | MMA/17FM/n-osh 50  50  0.8 | 1.0 | 100/65 | 16 | 33 | 117 |
| Example 7 | MMA/17FM/n-osh 50  50  1.0 | 0.5 | 100/65 | 18 | 31 | 117 |
| Example 8 | 17FM/3FA/n-osh 50  50  1.0 | 0.5 | 100/90 | 10 | 35 | 115 |
| Comparative Example 1 | — | — | 60/15 | 2 | 45 | 100 |
| Comparative Example 2 | MMA/BA/17FM/n-osh 50  30  20  0.1 | 2.5 | 100/60 | 5 | 50 | 105 |
| Comparative Example 3 | MMA/BA/17FM/n-osh 50  30  20  0.15 | 2.1 | 100/70 | 6 | 46 | 106 |
| Comparative Example 4 | MMA/BA/n-osh 80  20  0.5 | 1.5 | 60/15 | 7 | 40 | 108 |

EXAMPLE 9

The same reaction vessel as used in Example 1 was charged with 280 parts of deionized water, 1.5 parts of shown in Table 2.

TABLE 2

| | Monomer Composition | $\eta Sp/C$ | Stain Resistance ($\theta$) (water/oil) | Stickiness (min) | Flowability pressure (kg · m) | extrusion quantity (g/3 min) |
|---|---|---|---|---|---|---|
| Example 9 | MMA ← 17FM/MMA/n-osh 50    40  10  0.8 | 1.2 | 100/70 | 14 | 32 | 116 |
| Example 10 | 17FM/MMA/n-osh ← MMA 40  10  0.8    50 | 1.5 | 100/60 | 14 | 32 | 116 |
| Example 11 | MMA ← 3FM/EA/n-osh 50    40  10  0.8 | 1.4 | 100/50 | 12 | 35 | 114 |
| Example 12 | 17FM/EA/n-osh ← MMA 40  10  0.8    50 | 1.2 | 100/70 | 14 | 32 | 116 |

TABLE 2-continued

|  | Monomer Composition | ηSp/C | Stain Resistance (θ) (water/oil) | Stickiness (min) | Flowability pressure (kg · m) | Flowability extrusion quantity (g/3 min) |
|---|---|---|---|---|---|---|
| Example 13 | MMA ← 3FM/EA/n-osh<br>68       16/16  1.0 | 1.6 | 70/40 | 10 | 35 | 112 |
| Example 14 | 17FM/EA/n-osh ← MMA<br>40   10  0.4        50 | 1.9 | 100/70 | 10 | 35 | 114 |
| Example 15 | 17FM/EA/n-osh ← MMA<br>40   10  1.0        50 | 0.9 | 100/70 | 16 | 31 | 114 |
| Example 16 | 17FM/EA/n-osh ← MMA<br>40   10  2.0        50 | 0.4 | 100/70 | 18 | 30 | 118 |
| Example 17 | 17FM/EA/n-osh ← MMA<br>30   20  0.8        50 | 1.2 | 100/65 | 16 | 31 | 114 |
| Example 18 | 17FM/EA/n-osh ← MMA<br>17   33  0.8        50 | 1.1 | 100/60 | 16 | 30 | 116 |
| Example 19 | 17FM/EA//n-osh ← MMA<br>8   42  0.8        50 | 1.1 | 80/50 | 18 | 30 | 118 |
| Example 20 | MMA ← 3FA/EA/n-osh<br>50        40  10  0.8 | 1.3 | 100/60 | 12 | 35 | 114 |
| Comparative Example 5 | MMA ← 17FM/MMA<br>50        40   10 | 2.5 | 100/70 | 4 | 48 | 108 |
| Comparative Example 6 | 17FM/MMA/n-osh ← MMA<br>40   10   0.1        50 | 2.2 | 100/60 | 4 | 45 | 108 |
| Comparative Example 7 | MMA ← MMA/EA/n-osh<br>50        40   10  0.8 | 1.4 | 60/15 | 7 | 40 | 109 |

EXAMPLE 21

The same reaction vessel as used in Example 1 was charged with 280 parts of deionized water, 1.5 parts of sodium dioctylsulfosuccinate, 4.0 parts of cumene hydroperoxide, 10 parts of methyl methacrylate and 20 parts of 2,2,2-trifluoroethyl methacrylate (3FM), and the inner atmosphere of the reaction vessel was substituted with nitrogen and 4.0 parts sodium formaldehyde sulfoxylate was added while stirring, and then the inner temperature of the reaction vessel was elevated to 70° C. and heating was carried out with stirring for 3 hours to complete the polymerization of the first stage. Thereafter, in the presence of the obtained polymer, a mixture comprising 30 parts of styrene, 20 parts of butyl acrylate and 1.0 part of n-octylmercaptan was added dropwise as the monomer component of the second stage, over a period of 3 hours, and heating was conducted while stirring for 2 hours to complete the polymerization of the second stage. Then, in the presence of the polymers obtained at the first and second stages, 20 parts of methyl methacrylate was added dropwise as the monomer component of the third stage over a period of 2 hours and the mixture was heated while stirring for 3 hours to complete the polymerization of the third stage and obtain a three-stage polymer. Thereafter, salting-out, filtration, washing and drying were conducted under the same conditions as described in Example 1, to obtain a powdery polymer. The characteristics of a vinyl chloride resin composition comprising this polymer are shown in Table 3.

EXAMPLES 22 THROUGH 35 AND COMPARATIVE EXAMPLES 8 THROUGH 10

Three-stage polymers having a monomer composition shown in Table 3 were prepared under the same conditions as described in Example 21 in the same reaction vessel as used in Example 1. The characteristics of vinyl chloride resin compositions comprising these polymers are shown in Table 3.

TABLE 3

|  | Monomer Composition | ηSp/C | Stain Resistance (θ) (water/oil) | Stickiness (min) | Flowability pressure (kg · m) | Flowability extrusion quantity (g/3 min) |
|---|---|---|---|---|---|---|
| Example 21 | MMA/3FM ← St/BA/n-osh ← MMA<br>10   20       30 20  1.0        20 | 1.2 | 90/40 | 16 | 34 | 114 |
| Example 22 | MMA ← St/BA/3FM/n-osh ← MMA<br>20        30 20  10   1.0        20 | 1.2 | 80/30 | 16 | 34 | 114 |
| Example 23 | MMA ← St/BA/n-osh ← MMA/3FM<br>20        30 20  0.6        10   20 | 1.8 | 90/45 | 12 | 36 | 102 |
| Example 24 | MMA/n-osh ← 3FM/BA/n-osh ← MMA<br>40   0.1        20   20  1.0        20 | 1.0 | 90/45 | 14 | 31 | 118 |
| Example 25 | MMA ← BMA/BA/n-osh ← MMA/3FM<br>20        20   30  1.0        20   10 | 1.3 | 80/35 | 18 | 32 | 116 |
| Example 26 | MMA ← BMA/EA/n-osh ← 3FM<br>40        20   30  1.0        10 | 1.3 | 85/40 | 18 | 32 | 116 |
| Example 27 | 3FM ← BMA/EA/n-osh ← MMA<br>20        20   30  1.0        30 | 1.2 | 90/40 | 18 | 32 | 116 |
| Example 28 | 3FM ← BMA/EA/n-osh ← MMA<br>20        20   30  1.6        30 | 0.8 | 90/40 | 18 | 31 | 118 |
| Example 29 | 3FM ← BMA/EA/n-osh ← MMA<br>20        20   30  2.0        30 | 0.5 | 90/40 | 20 | 30 | 119 |
| Example 30 | MMA ← St/BA/17FM/n-osh ← MMA<br>20        30 20  10   2.0        20 | 0.5 | 90/40 | 18 | 31 | 118 |
| Example 31 | MMA ← St/BA/3FM/n-osh ← MMA<br>20        25 20  15   1.0        20 | 1.1 | 90/40 | 16 | 34 | 115 |

TABLE 3-continued

| | Monomer Composition | $\eta Sp/C$ | Stain Resistance ($\theta$) (water/oil) | Stickiness (min) | Flowability pressure (kg · m) | Flowability extrusion quantity (g/3 min) |
|---|---|---|---|---|---|---|
| Example 32 | MMA ← St/BA/3FM/n-osh ← MMA<br>20    20 20 20  1.0    20 | 1.1 | 90/45 | 10 | 34 | 115 |
| Example 33 | MMA ← St/BA/3FM/n-osh ← MMA<br>20    10 20 30  1.0    20 | 1.0 | 95/50 | 20 | 30 | 119 |
| Example 34 | MMA ← St/EA/3FA/n-osh ← MMA<br>20    30 20 10  1.0    20 | 1.2 | 70/60 | 16 | 34 | 114 |
| Example 35 | MMA ← BA/3FA/3FM/n-osh ← MMA<br>20    30 10 10  1.0    30 | 1.1 | 100/65 | 18 | 32 | 116 |
| Comparative Example 8 | MMA ← St/BA/3FM ← MMA<br>20    30 20 10    20 | 2.8 | 80/30 | 5 | 47 | 103 |
| Comparative Example 9 | MMA/n-osh ← St/BA/3FM ← MMA<br>62  0.5    5 5 8    20 | 2.5 | 75/25 | 4 | 52 | 102 |
| Comparative Example 10 | MMA ← St/BA/n-osh ← MMA<br>30    30 20 1.0    20 | 1.9 | 60/15 | 8 | 36 | 105 |

The flowability characteristics (melt index MI) of the fluoroacrylic polymers obtained in the foregoing examples and comparative examples are shown in Table 4.

TABLE 4

| Flowability of Polymer Alone | |
|---|---|
| Example No. or Comparative No. of Polymer | MI (g/10 min) |
| Example 1 | 2.5 |
| Example 7 | 3.0 |
| Example 9 | 2.6 |
| Example 16 | 3.3 |
| Example 21 | 2.5 |
| Example 30 | 3.3 |
| Comparative Example 2 | 2.1 |
| Comparative Example 5 | 2.0 |
| Comparative Example 8 | 2.0 |
| Comparative Example 1* | 2.0 |

Note
*: vinyl chloride resin

EXAMPLES 36 THROUGH 41

Vinyl chloride resin compositions were prepared in the same manner as described in Examples 1 through 35 by using the fluoroacrylic polymer (three-stage polymer) obtained in Example 22, and the stain resistance, stickiness and flowability were determined with respect to each of the obtained resin compositions. Note, the amount added of the fluoroacrylic polymer was changed as shown in Table 5. These results, as well as the results obtained in Example 22, are shown in Table 5.

TABLE 5

| | Monomer Composition *1 | Amount Added (parts) | Stain Resistance (water/oil) ($\theta$) | Stickiness (min) | Flowability pressure (kg · m) | Flowability extrusion quantity (g/3 min) |
|---|---|---|---|---|---|---|
| Example 36 | MMA ← St/BA/3FM/n-osh ← MMA<br>20    30 20 10  1.0    20 | 0.04 | 65/25 | 5 | 42 | 105 |
| Example 37 | MMA ← St/BA/3FM/n-osh ← MMA<br>20    30 20 10  1.0    20 | 0.3 | 65/25 | 8 | 40 | 109 |
| Example 38 | MMA ← St/BA/3FM/n-osh ← MMA<br>20    30 20 10  1.0    20 | 1.0 | 75/30 | 14 | 35 | 114 |
| Example 22 | MMA ← St/BA/3FM/n-osh ← MMA<br>20    30 20 10  1.0    20 | 3.0 | 80/30 | 16 | 34 | 114 |
| Example 39 | MMA ← St/BA/3FM/n-osh ← MMA<br>20    30 20 10  1.0    20 | 5.0 | 90/60 | 18 | 32 | 115 |
| Example 40 | MMA ← St/BA/3FM/n-osh ← MMA<br>20    30 20 10  1.0    20 | 10 | 100/80 | hardly wrapped on roll for more 20 minutes | 30 | 108 |
| Example 41 | MMA ← St/BA/3FM/n-osh ← MMA<br>20    30 20 10  1.0    20 | 20 | 100/95 | hardly wrapped on roll for more 20 minutes | 30 | 122 |
| Comparative Example 11 | MMA ← St/BA/3FM/n-osh ← MMA<br>20    30 20 10  1.0    20 | 23 | 100/95 | not wrapped on roll and measurement impossible | 25 | 120 |

Note
*1: same as composition of Example 22

EXAMPLES 42 THROUGH 48 AND COMPARATIVE EXAMPLES 12 THROUGH 18

Using a Henschel mixer, 100 parts of a thermoplastic resin shown in Table 6 was mixed or not mixed with 3 parts of the polymer obtained in Example 22. Each resin composition was extruded at an extrusion temperature indicated below by using a single-screw extruder having a screw diameter of 25 mm and the extrusion quantity (g/10 min) was measured, and the flowability was tested. Furthermore, the pressure (kg·cm) at the extrusion was measured. The results are shown in Table 6. A larger extrusion quantity and a high extrusion pressure indicate a larger lubricating property.

(1) ABS Resin (Diapet ® ABS #3001 supplied by Mitsubishi Rayon)
  Extrusion temperatures: $C_1$=180° C., $C_2$=200° C., $C_3$=200° C., head =200° C., die =200° C.
(2) Styrene Resin (Styrol NF-20 supplied by Idemitsu Sekiyu Kagaku)

Extrusion temperatures: $C_1=160°$ C., $C_2=180°$ C., $C_3 200°$ C., head $=200°$ C., die $=210°$ C.

(3) Polycarbonate Resin (Novalex 7022 supplied by Mitsubishi Kasei Kogyo)

Extrusion temperatures: $C_1=230°$ C., $C_2=260°$ C., $C_3=270°$ C., head $=270°$ C., die $=280°$ C.

(4) Polyethylene Resin (Hizex 7000F. supplied by Mitsui Sekiyu Kagaku)

Extrusion temperatures: $C_1=150°$ C., $C_2=65°$ C., $C_3=175°$ C., head $=175°$ C., die $=175°$ C.

(5) Polyester Resin (Dianite$^R$ PA-200 supplied by Mitsubishi Rayon)

Extrusion temperatures: $C_1=280°$ C., $C_2=280°$ C., $C_3=280°$ C., head $=260°$ C., die $=260°$ C.

(6) Vinyl Chloride Resin (Hishinichi PVC, average polymerization degree of 700)

Extrusion temperatures: $C_1=160°$ C., $C_2=170°$ C., $C_3=180°$ C., head $=175°$ C., die $=180°$ C.

(7) Polyphenylene Ether Resin (PPE) (Noryl 731J supplied by GE plastics)

Extrusion temperatures: $C_1=200°$ C., $C_2=260°$ C., $C_3=260°$ C., head $=260°$ C., die $=260°$ C.

TABLE 6

|  | Fluoroacrylic Polymer | Pressure (kg·m) at Extrusion | Extrusion Quantity (g/10 min) | Stain Resistance ($\theta$) (water/oil) |
|---|---|---|---|---|
| ABS Resin | Example 42 | added | 30 | 360 | 70/25 |
|  | Comparative Example 12 | not added | 36 | 320 | 50/10 |
| Styrene Resin | Example 43 | added | 35 | 350 | 90/40 |
|  | Comparative Example 13 | not added | 40 | 310 | 65/20 |
| Polycarbonate Resin | Example 44 | added | 30 | 300 | 90/40 |
|  | Comparative Example 14 | not added | 38 | 250 | 60/20 |
| Polyethylene Resin | Example 45 | added | 30 | 380 | 70/25 |
|  | Comparative Example 15 | not added | 34 | 340 | 50/10 |
| Polyester Resin | Example 46 | added | 35 | 350 | 80/40 |
|  | Comparative Example 16 | not added | 40 | 300 | 60/20 |
| Vinyl Chloride Resin | Example 47 | added | 35 | 340 | 80/30 |
|  | Comparative Example 17 | not added | 40 | 310 | 60/15 |
| PPE Resin | Example 48 | added | 28 | 290 | 85/35 |
|  | Comparative Example 18 | not added | 35 | 260 | 55/20 |

As apparent from the foregoing description, molding resin compositions formed by incorporating the fluoroacrylic polymer of the present invention into various thermoplastic resins are superior to the conventional thermoplastic resins free of this polymer, in release property and flowability at the molding step, the stain resistance (water repellency and oil repellency) and gloss of the resultant molded articles are very good, and the productivity is improved.

We claim:

1. A fluoroacrylic polymer having a lubricating effect, which comprises at least one member selected from the group consisting of units derived from a fluoroalkyl acrylate and units derived from a fluoroalkyl methacrylate as a part of all of structural units and a reducing viscosity $\eta Sp/C$ not higher than 2 as measured at 25° C. with respect to a solution of 0.1 g of the polymer in 100 ml of chloroform, wherein when the fluoroacrylic polymer is a random copolymer, the random copolymer has a $T_g$ of no higher than 70° C., wherein when the fluoroacrylic polymer is prepared by a two-stage polymerization process, the resulting polymer has a $T_g$ of no higher than 70° C. after a first stage of the polymerization or after a second stage of the polymerization, and wherein when the fluoroacrylic polymer is prepared by a three-stage polymerization process, a polymer obtained by the second stage of the polymerization has a $T_g$ of no higher than 70° C.

2. A fluoroacrylic polymer as set forth in claim 1, wherein the fluoroalkyl acrylate or methacrylate is selected from the monomers represented by the basic structural formula (I),

$$CH_2=\overset{Z}{\underset{|}{C}}-\overset{O}{\underset{\|}{C}}-O\!\!+\!\!CH_2)_{\overline{m}}(CF_2)_{\overline{n}}X \qquad (I)$$

wherein m is 0 or an integer of from 1 to 5, n is an integer of from 1 to 10, X is F or H, and Z is H or $CH_3$.

3. A fluoroacrylic polymer as set forth in claim 2, wherein the fluoroalkyl methacrylate is selected from 2,2-difluoroethyl methacrylate (2FM), 2,2,2-trifluoroethyl methacrylate (3FM), 2,2,3,3-tetrafluoropropyl methacrylate (4FM), 2,2,3,3,3-pentafluoropropyl methacrylate (5FM), 2,2,3,3,4,4-hexafluorobutyl methacrylate (6FM), 2,2,3,3,4,4,5,5-octafluoropentyl methacrylate (8FM), 1,1-ditrifluoromethyl-2,2,2-trifluoroethyl methacrylate (9FM), 2,2,3,3,4,4,5,5,6,6,7,7-dodecafluoroheptyl methacrylate (12FM), 3,3,4,4,5,5,6,6,7,7,8,8,8-tridecafluorooctylmethyl methacrylate (13FM), and 3,3,4,4,5,5,6,6,7,7,8,8,9,9,10,10,10-heptadecafluorodecyl methacrylate (17FM).

4. A fluoroacrylic polymer as set forth in claim 2, wherein the fluoroalkyl acrylate is selected from 2,2-difluoroethyl acrylate (2FA), 2,2,2-trifluoroethyl acrylate (3FA), 2,2,3,3-tetrafluoropropyl acrylate (4FA), 2,2,3,3,3-pentafluoropropyl acrylate (5FA), 2,2,3,3,4,4-hexafluorobutyl acrylate (6FA), 2,2,3,3,4,4,5,5-octafluoropentyl acrylate (8FA), 1,1-ditrifluoromethyl-2,2,2-trifluoroethyl acrylate (9FA), 2,2,3,3,4,4,5,5,6,6,7,7-dodecafluoroheptyl acrylate (12FA), 3,3,4,4,5,5,6,6,7,7,8,8,8-tridecafluorooctylmethyl acrylate (13FA), and 3,3,4,4,5,5,6,6,7,7,8,8,9,9,10,10,10-heptadecafluorodecyl acrylate (17FA).

5. A fluoroacrylic polymer as set forth in claim 1, wherein the reducing viscosity $\eta Sp/C$ is not higher than 1.8.

6. A fluoroacrylic polymer as set forth in claim 1, wherein the reducing viscosity is adjusted according to a chain transfer agent, catalyst and polymerization temperature adopted at the polymerization.

7. A fluoroacrylic polymer as set forth in claim 1, wherein at least one kind of fluoroalkyl acrylate units and fluoroalkyl methacrylate units is contained in an amount of at least 5.0% by weight, as the structural units.

8. A fluoroacrylic polymer as set forth in claim 1, wherein copolymerized comonomer units are contained.

9. A fluoroacrylic polymer as set forth in claim 8, wherein the comonomer is selected from methacrylates such as methyl methacrylate, ethyl methacrylate, propyl methacrylate, butyl methacrylate, 2-ethylhexyl methacrylate and benzyl methacrylate, acrylates such as ethyl acrylate, propyl acrylate, butyl acrylate, 2-ethylhexyl acrylate and benzyl acrylate, and acrylamide, acrylic acid, methacrylic acid, styrene, alkyl-substituted styrene, halogenostyrene, acrylonitrile and methacrylonitrile.

* * * * *